M. BREMSY.
MECHANICALLY OPERATED ROAD MAP.
APPLICATION FILED SEPT. 8, 1909.
1,064,694. Patented June 10, 1913.
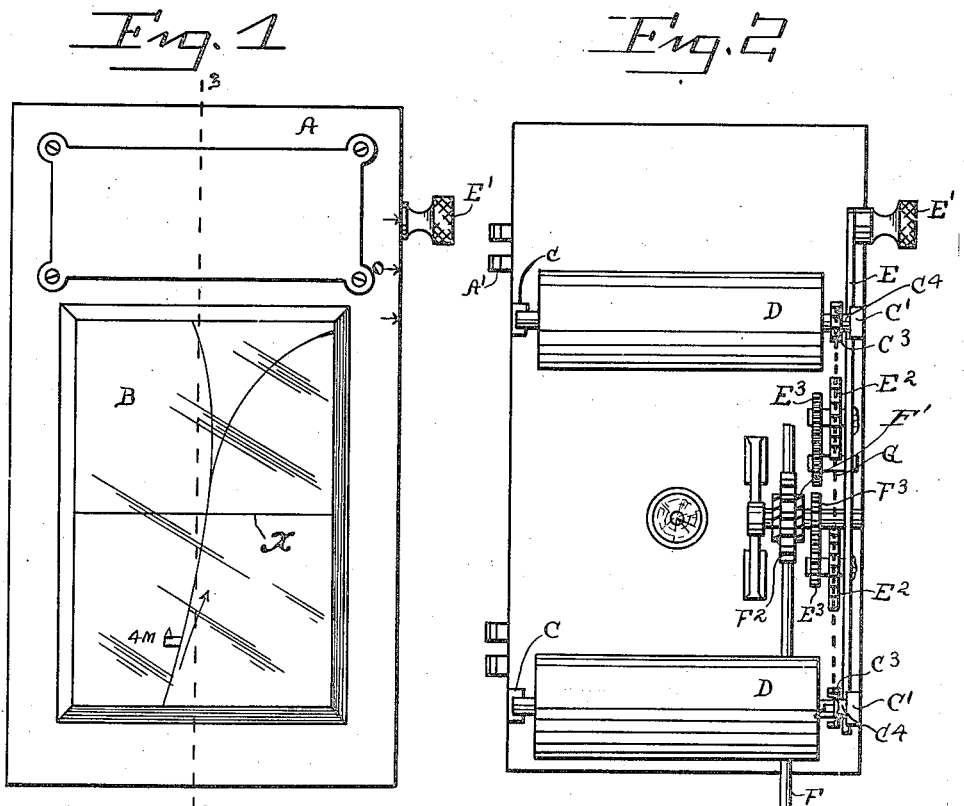
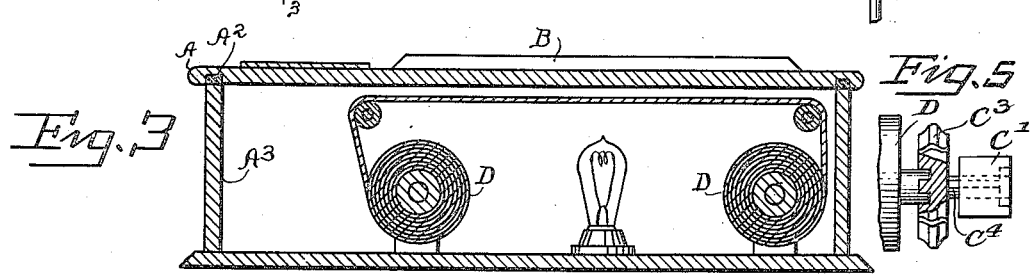
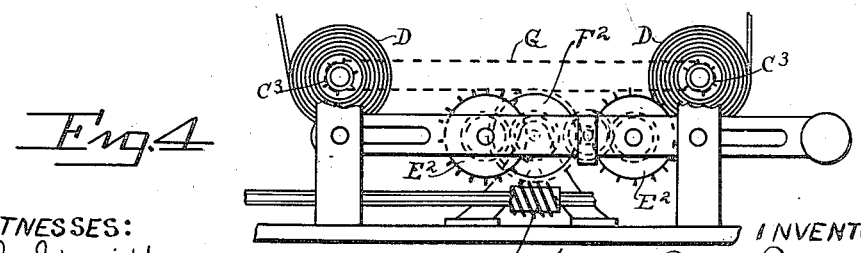

Figure # UNITED STATES PATENT OFFICE.

MAX BREMSY, OF NEW ROCHELLE, NEW YORK.

MECHANICALLY-OPERATED ROAD-MAP.

1,064,694.　　　　　　　　Specification of Letters Patent.　　Patented June 10, 1913.

Application filed September 8, 1909. Serial No. 516,779.

*To all whom it may concern:*

Be it known that I, MAX BREMSY, a citizen of the United States, and resident of New Rochelle, in the county of Westchester and State of New York, have invented certain new and useful Improvements in Mechanically-Operated Road-Maps, of which the following is a specification.

With the advent of rapidly moving vehicles designed to travel upon the ordinary roads or highways, at the will and under the guidance of the operator, the necessity for carefully planned and measured maps asserted itself, and map makers in general have given a great deal of attention and care to the production of a class of guides called road maps.

This device is intended to considerably assist the driver of an auto-car in traveling any roadway or course with which he is unfamiliar.

It consists of a guide and a mechanism for operating the same.

My apparatus arranges so that the map shall travel slowly but continuously, and shall present to the view of the operator his exact position on the road, with only sufficient of the adjacent territory to allow him to recognize and memorize the course for future use.

I employ a water tight casing for retaining the map in its position and I employ a simple mechanism connected preferably by a flexible shaft to one of the wheels of the vehicle, and in the best development of my device I have illuminating means within the casing for use at night. I present a surface of map under a glass of about eight square inches, and as I have designed and timed my apparatus this will show to the operator eight miles of roadway and four miles horizontally, or in all thirty two square miles of territory and I locate the operator's position centrally within this large tract.

Other advantages of my invention and means for securing them will develop as the specification proceeds.

The following is what I consider the best means of carrying out this invention.

The accompanying drawings form a part of this specification.

Figure 1 is a plan view of my apparatus. Fig. 3 is a side elevation partly in horizontal section on the line 3—3 in Fig. 1. Fig. 2 is a plan view, the cover, sides and map having been removed to expose to view the interior mechanism. Fig. 4 shows in detail the driving mechanism. Fig. 5 shows on a larger scale one of the bearing blocks for the rolls and the roller shaft socketed therein, this figure is partly in section.

Similar letters of reference indicate like parts in all the figures where they appear.

A indicates the top or cover of the inclosing casing, it is fitted with hinges $A^1$ and a portion of the top is cut away to provide an opening in which a sheet of heavy beveled glass B is inserted, to expose to view a map which passes beneath. The under side of the cover is provided with a groove in which a gasket $A^2$ is secured. The body of the box $A^3$ as well as the cover may be made of brass or any suitable material preferably metal, but should be firm and water tight in construction.

The operating mechanism bearings, etc., are secured to the inner side of the bottom of the cabinet. Brackets C, C, $C^1$, $C^1$, serve as bearings for the map rollers D, D. A slide E operable from the outside by the knob $E^1$, carries sprockets $E^2$, and cut gears $E^3$. Each sprocket $E^2$ is securely attached to an adjacent gear $E^3$. A flexible shaft F connected by suitable means with one of the wheels of the automobile, has its upper end extending within the casing $A^3$, and carries on the upwardly extending end a worm-gear $F^1$, which meshes with a worm-wheel $F^2$. Securely attached to the worm-wheel $F^2$ is a cut-gear $F^3$, so arranged that the operation of the knob $E^1$ will cause the slide E to bring one of the cut-gears $E^3$ in mesh with the cut-gear $F^3$ for a purpose which shall appear later. A sprocket wheel $C^3$, on a shaft $C^4$ is rotatably mounted in the bearing bracket $C^1$ in such a manner as to bring the axis of the sprocket $C^3$ in line with the axis of the roll D. A chain G connects the two sprockets $C^3$, $C^3$ together and in doing so is caused to mesh reliably with each of the sprockets $E^2$. The inner end of the shafts $C^4$ are socketed and one end of the shaft of each of the rollers D is squared to fit one of the sockets in the shafts $C^4$, $C^4$.

A series of maps covering any desired portion of a country's highways are rolled upon rollers similar to those indicated by D, and when my device is placed in operation a roller containing a map is placed in one of the pairs of bearing brackets C, $C^1$, by having the squared end slipped through the hole in the bracket C¹, and socketed in the shaft C⁴. The bearing in the bracket C is an open top bearing and the roller D can be easily dropped into its position there. An empty roller now being in place in the other bearings C, C¹, the end of the map is attached thereto, and if the knob E¹ is not in the central position or opposite the mark indicated by O, it should be now placed there. The rollers are operated to allow the map to expose to view that portion of the road desired. The cover A is now closed down and if the operator has so adjusted the map, the button E¹ can be pushed in position with the result that any movement of the wheels of the automobile will cause the map to move in its proper direction.

The button E¹ performs an important function which it is possible I have not yet made plain, that is in traveling from one town to another the button is pushed in a forward position, and it will indicate, if all things are properly adjusted, the route in going to that town. When it is desired to return over the same road the button E¹ is placed in the exact opposite position and the map will run apparently backward but will be found to be indicating the route for the return.

At $x$ I have shown a hair line drawn horizontally across the glass. In the most complete operation of the device the traveler's position is assumed to be directly under this hair line or rather at the intersection of this line with the road beneath.

Modifications may be made within the scope of the appended claim without departing from the principle or sacrificing the advantages of this invention.

I have in my experiments operated this device in conjunction with other devices driven by a flexible shaft as a speedometer, odometer, etc.

What I claim and desire to secure by Letters Patent is:

A mechanically operated road map comprising a winding and a re-winding roll, a sprocket secured in operable relation with each of said rolls and an endless chain engaging both said sprockets, a driving mechanism comprising a worm and a gear and worm wheel secured together and operated by means of said worm, and a driven mechanism comprising a pair of sprockets in mesh with said chain, and means operatively connected to said sprockets and adapted to be brought into driving engagement with said driving gear for alternately driving said sprockets in opposite directions.

Signed at New York city, in the county of New York and State of New York this 30th day of August A. D. 1909.

MAX BREMSY.

Witnesses:
 MAX SCHUTZ,
 F. A. CHICKERING.